Patented Apr. 24, 1934

1,956,343

UNITED STATES PATENT OFFICE 1,956,343

OILCLOTH

Andrew B. Buchanan, Peekskill, N. Y.

No Drawing. Application December 5, 1930,
Serial No. 500,442

7 Claims. (Cl. 91—68)

This invention relates to oilcloth and to a process of making oilcloth and has particular reference to improvements in a backing for oilcloth and in coating compositions suitable for the manufacture of the backing.

The first step in the manufacture of oilcloth consists in the filling of the textile fabric. At the present time it is usual to apply at least three ground coats of filling compositions in order to build up a suitable backing for the finish coating. Each ground coat must be dried and calendered before the next coat is applied. The filling compositions usually contain oils, pigments and an organic solvent or thinner such as naphtha. I have found that the presence of the organic solvent or thinner causes the compositions to penetrate into and even go through the cotton cloth.

This disadvantage and other disadvantages in methods of manufacturing oilcloth heretofore practiced are avoided by my invention because of the character of the coating compositions used in making my backing. Broadly, these compositions comprise at least the following three ingredients: first, a water paste of an adhesive, by which term I mean to include any glue such as casein, flour, starch or latex; second, a heavy boiled vegetable oil or varnish; and third, a suitable filler or pigment, for example a clay or silex. The adhesive may consist of only one adhesive or a mixture of two or more. These compositions are characterized by the absence of organic solvents and thinners, water being used to produce a composition of the desired consistency.

Following are examples of suitable compositions, it being understood that the invention is not restricted to the particular ingredients or proportions specifically mentioned.

Example 1

| | Pounds |
|---|---|
| Casein paste | 2 |
| Heavy boiled linseed oil | 1 |
| Dry china clay | 4 |

Example 2

| | Pounds |
|---|---|
| Casein or glue paste | 1 |
| Latex | 1 |
| Dry china clay | 2 |
| Dry silex | 2 |
| Varnish | ¼ |

Example 3

| | Pounds |
|---|---|
| Casein or glue paste | 1 |
| Heavy boiled linseed oil | 1 |
| Dry china clay | 2 |
| Dry silex | 2 |

Example 4

| | Pounds |
|---|---|
| Casein paste | 1 |
| Heavy boiled linseed oil | ½ |
| China clay | 3 |
| Flour or starch mixture | 1 |

Example 5

| | Pounds |
|---|---|
| Casein paste | 2 |
| Flour or starch mixture | 2 |
| Heavy boiled drying oil | 1 |
| China clay | 5 |

Example 6

| | Pounds |
|---|---|
| Casein paste | 2 |
| Flour or starch mixture | 1 |
| Heavy boiled drying oil | 1 |
| China clay | 4 |

Example 7

| | Pounds |
|---|---|
| Casein paste | 1½ |
| Heavy boiled drying oil | ½ |
| China clay | 4 |
| Varnish | ¼ |

Example 8

| | Pounds |
|---|---|
| Rubber latex | 1 |
| Casein paste | ½ |
| Heavy boiled drying oil | ¼ |
| China clay | 2 |

Example 9

| | Pounds |
|---|---|
| Casein paste | 1 |
| Rubber latex | 1½ |
| China clay | 4 |
| Varnish | ½ |

Example 10

| | Pounds |
|---|---|
| Rubber latex | 1 |
| Casein paste | ½ |
| China clay | 4 |
| Varnish | ½ |

The casein paste mentioned in the above examples preferably consists of a mixture of casein, ammonia, and water, about 1 lb. of casein to about 7 lbs. of water and enough aqua ammonia to dissolve the casein. One pint (12 ounces) of ordinary household ammonia is sufficient. When the more concentrated commercial aqua ammonia is used, a smaller amount is sufficient. Other alkalies may be used in place of the ammonia, although the latter is preferable. The relative proportions of casein, water and alkali may be varied considerably. When the casein paste contains less water, if necessary, water may be added to the final composition to give it the desired consistency.

The casein may be replaced by any kind of glue thinned with water to the desired consistency, no alkali being necessary in the case of glue other than casein. Any kind of clay may be used in place of the china clay and silex. Clay or silex may be used alone or in admixture with each other. The varnish may be of any kind comprising a gum or resin and a drying oil. A rosin varnish is preferable. The flour mixture is composed of any kind of flour, preferably rye flour, and water, 1 part of flour to 6 parts of water being the preferred proportions. The amount of water may be varied widely. Substantially the same amount of water is preferred in the starch mixture. Any of the vegetable oils, including linseed oil and China-wood oil may be used provided they are boiled to a heavy consistency. The semi-drying oils, for example cottonseed oil, or non-drying oils may be used provided they are boiled to a heavy-consistency. Linseed oil is kept at a temperature of about 610° F. for several hours until it becomes very thick. Oils of a thinner consistency may be used but do not give as good results. I prefer to use the same oil as is generally used in the art, i. e., what is generally known as heavy boiled oil, but instead of thinning it with naphtha, I thin it, so to speak, with any ingredient in my compositions which contains water, for example, with the casein paste. Thorough mixing of casein paste with boiled linseed oil, for example, produces a very strong sticky mixture with which the pigment is incorporated. While this is the preferred method of compounding the composition, it is to be understood that the ingredients may be mixed in any order. The finished composition should be of such a consistency that when applied to the cloth it will ride over and fill the meshes without penetrating. If necessary, it can be thinned by the addition of water.

My invention is not restricted to the use of any definite proportions of the ingredients. They may be varied widely; for example, I may use from about 2% to about 30% of the adhesive, about 4% to about 20% of boiled oil or varnish and about 20% to about 75% of pigment, the remainder being water. The best results are obtained by using 3% to 13% of adhesive, 10% to 16% of boiled oil or varnish, 30% to 50% of pigment and 11% to 34% of water.

The coating may, of course, be applied to the sheeting in any suitable manner. This may be done by hand or on a coating machine. Care must be taken, however, that the composition is not pressed into the sheeting. The coating is then dried and the coated sheeting is passed between calendering rolls.

The sheeting used is of the kind generally employed in the art depending upon the use to which the oilcloth is to be put. By my invention I can make any kind of light-weight table, shelf, carriage or enamelled oilcloth or oilcloth wall covering.

By using the above described compositions, I am enabled to make oilcloth very cheaply because for most purposes one thick coating of any one of these compositions is sufficient. But, of course, more than one coat may be applied and, if desired, one or more of the coats may consist of compositions other than those herein disclosed, for example, compositions of the type heretofore used in the art. Not only are my compositions cheap to compound but also my method eliminates several operations which are necessary when using the compositions hitherto employed. My backing is, of course, given one or more of the usual finishing coats. Any of the finishing compositions well known in the art may be used. The material may then be colored or printed with designs, calendered and finished in the usual way. The finished product is of excellent quality and will not crack.

I claim:

1. An oilcloth backing comprising a textile fabric having a coating of a composition comprising a gelatinous adhesive, the solid constituents of latex, heavy boiled vegetable oil and a pigment, the constituents of said composition being present in such proportions as to yield a thick coating which does not impregnate the fabric to any substantial extent.

2. An oilcloth backing comprising a textile fabric having a coating of a composition comprising a gelatinous adhesive, the solid constituents of latex, a resinous varnish and a pigment, the constituents of said composition being present in such proportions as to yield a thick coating which does not impregnate the fabric to any substantial extent.

3. An oilcloth backing comprising a textile fabric having a coating of a composition comprising a gelatinous adhesive, a heavy boiled vegetable oil and a pigment, the constituents of said composition being present in such proportions as to yield a thick coating which does not impregnate the fabric to any substantial extent.

4. An oilcloth backing comprising a textile fabric having a coating of a composition comprising casein, heavy boiled drying oil and a clay, the constituents of said composition being present in such proportions as to yield a thick coating which does not impregnate the fabric to any substantial extent.

5. An oilcloth backing comprising a textile fabric having a coating of a composition comprising casein, heavy boiled linseed oil, china clay and silex, the constituents of said composition being present in such proportions as to yield a thick coating which does not impregnate the fabric to any substantial extent.

6. Oilcloth comprising a backing consisting of a textile fabric coated with a composition comprising a gelatinous adhesive, a heavy boiled vegetable oil, a clay and water, and a finishing coat on said backing, the constituents of said composition being present in such proportions as to yield a thick coating which does not impregnate the fabric to any substantial extent.

7. Method of making oilcloth which comprises coating a textile fabric with a relatively thick coating of a composition comprising a gelatinous adhesive, a heavy boiled vegetable oil, a clay and water, drying the coated fabric and calendering the same, the constituents of said composition being present in such proportions as to yield a thick coating which does not impregnate the fabric to any substantial extent.

ANDREW B. BUCHANAN.